J. E. LARSH.
BELT SHIFTING MECHANISM.
APPLICATION FILED JULY 15, 1921.
1,414,290.
Patented Apr. 25, 1922.
2 SHEETS—SHEET 1.
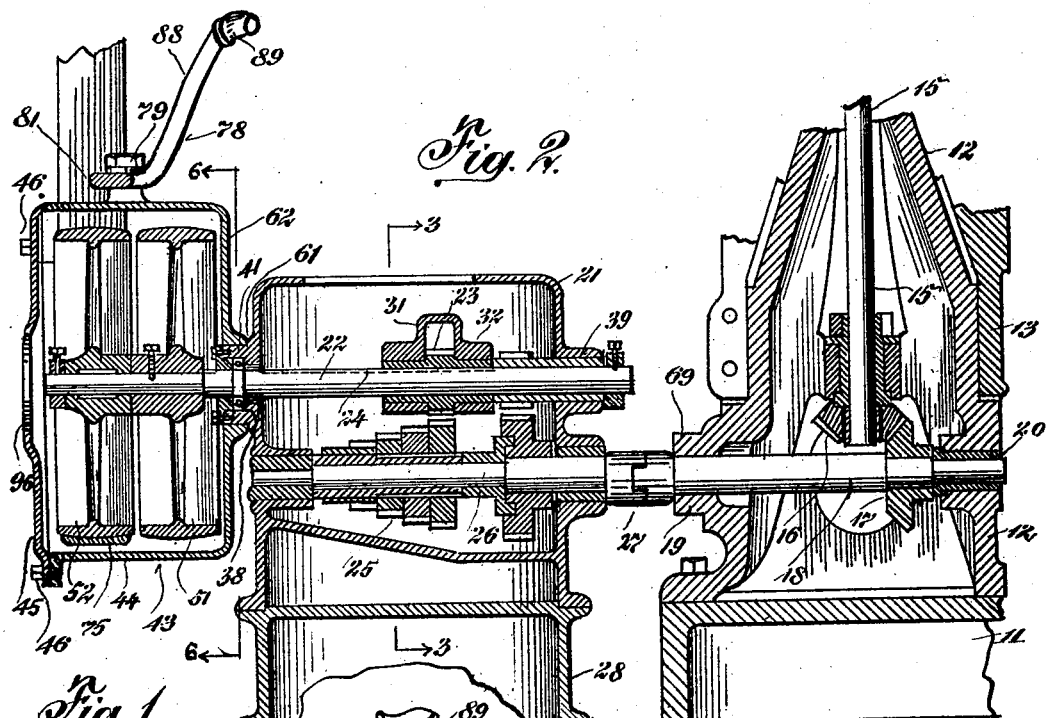
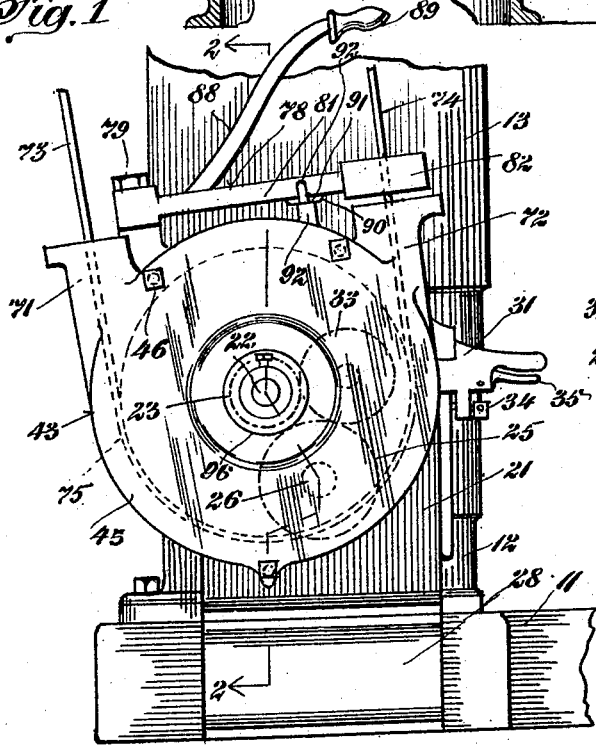
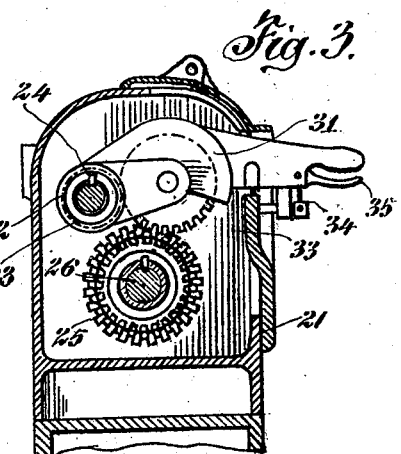
Inventor.
James E. Larsh,

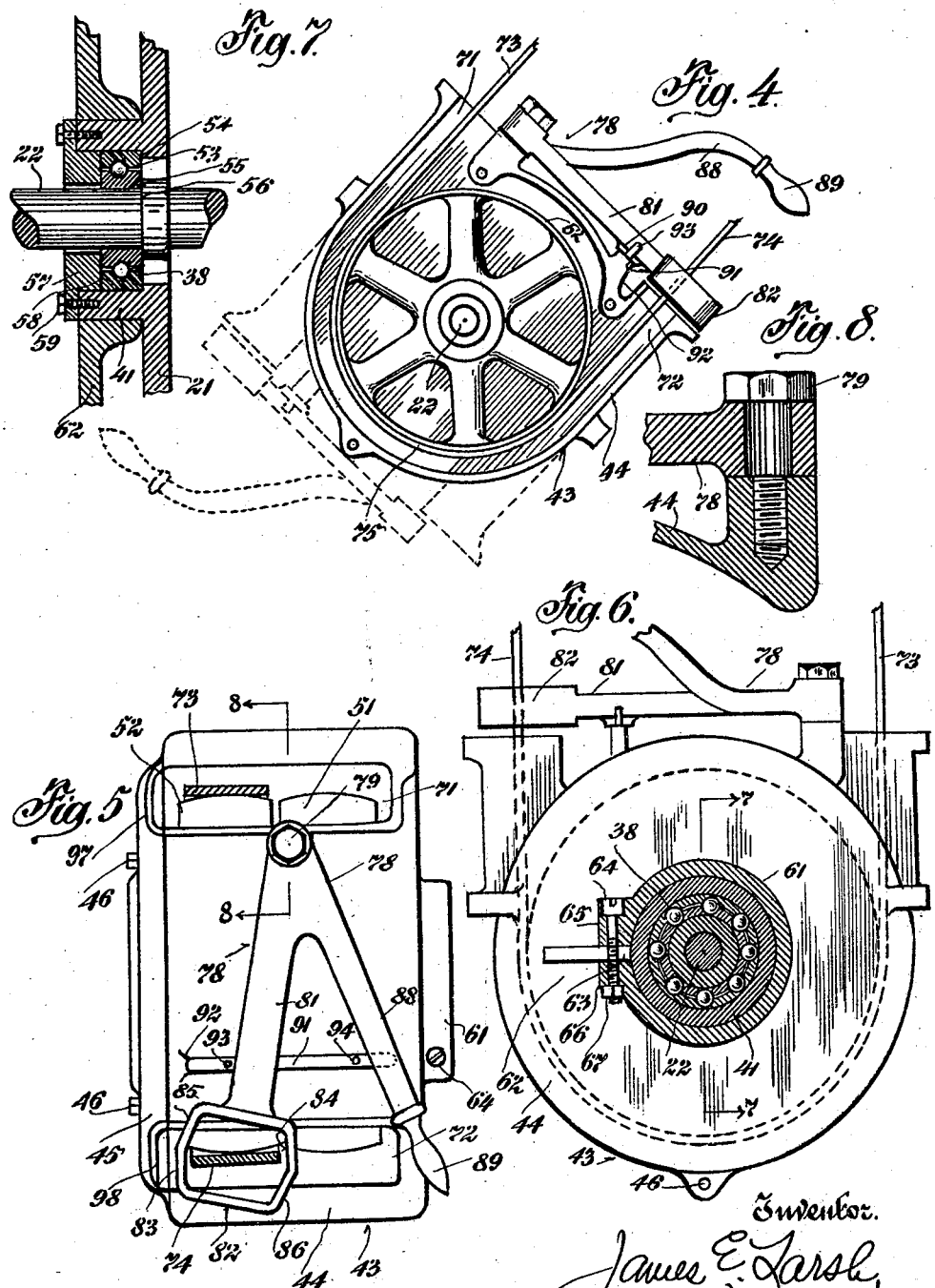

UNITED STATES PATENT OFFICE.

JAMES E. LARSH, OF CHEVIOT, OHIO, ASSIGNOR TO THE FOSDICK MACHINE TOOL COMPANY, OF CINCINNATI, OHIO, A CORPORATION OF OHIO.

BELT-SHIFTING MECHANISM.

1,414,290.  Specification of Letters Patent.  Patented Apr. 25, 1922.

Application filed July 15, 1921. Serial No. 484,958.

*To all whom it may concern:*

Be it known that I, JAMES E. LARSH, a citizen of the United States, residing in the village of Cheviot, in the county of Hamilton and State of Ohio, have invented certain new and useful Improvements in Belt-Shifting Mechanism, of which the following is a specification.

It is the object of my invention to provide new and improved belt shifting mechanism arranged in such manner that the belt may be projected in various suitable directions transverse to the pulleys for readily adapting the mechanism for belt drive from driving pulleys in various radial relations to the tight and loose pulleys.

It is the object of my invention, further, to provide a casing arranged to be received about the driven pulley, and, adjustable about the axis of rotation of the latter, and having thereon a belt-shifter movable with the casing; further, to provide a casing arranged to contain the driven pulley, and having belt-openings therein for the opposite stretches of a belt received about the pulley, and having thereon a belt-shifter acting upon the belt, with means whereby the casing with its belt-openings and the belt-shifter may be adjusted about the axis of rotation of the driven pulley, and secured in place in adjusted positions, for accommodating a belt regardless of the direction from which the belt projects radially with relation to said axis of rotation.

The invention will be further readily understood from the following description and claims, and from the drawings, in which latter:

Fig. 1 represents an end elevation of an embodiment of my invention shown in connection with a radial metal drilling machine, the latter partly broken away.

Fig. 2 is a vertical axial section of the same taken partly on the irregular section line 2—2 of Fig. 1.

Fig. 3 is a cross-section taken on a line corresponding to the line 3—3 of Fig. 1.

Fig. 4 is an end elevation of my improved device showing the same arranged in radial position different from that shown in Fig. 1 in full lines, and in an opposite relation in dotted lines, the end plate being removed.

Fig. 5 is a plan view of my improved device, with the belt-shifter arranged uppermost.

Fig. 6 is a vertical cross-section of the same, taken on a line corresponding to the line 6—6 of Fig. 2.

Fig. 7 is a detail in longitudinal section taken in the plane of the line 7—7 of Fig. 6; and, Fig. 8 is a detail in cross-section on the line 8—8 of Fig. 5.

I have shown my improvement as arranged in the driving mechanism of a so-called radial drilling machine for operating on metal. The drilling machine may be of usual or ordinary construction, and is indicated in the drawings as comprising a usual base 11, which may have a work-support thereon, and from which a post 12 extends upwardly. A sleeve or column 13 is located about the post, and is rotatable thereabout in usual manner, and is arranged to be clamped to the post in usual manner. The sleeve or column has a usual radial drill-arm projecting radially therefrom, not shown because well known.

The radial drill-arm supports a usual laterally adjustable drill-head, in which a rotatable drill-spindle is journaled, the latter having secured thereto a usual drill for operating on the work. Rotative movements as well as axial feeding movements are imparted to the drill-spindle by suitable mechanism. The operative movements may be imparted to the drill-spindle in any usual or ordinary manner. These parts are not shown because well known. The operating mechanism for the drilling machine is shown as comprising an upright shaft 15 suitably journaled in the post, and having a bevel-gear 16 fast thereon, which is meshed by a bevel-gear 17, fast on a shaft 18, journaled in bearings 19, 20, in the lower end of the post.

A variable speed gear-box is exemplified at 21, for changing the speeds imparted by a drive-shaft 22 to the shaft 18, through the medium of a gear 23 having spline-key connection 24 with the drive-shaft, and sliding lengthwise on said drive-shaft, and arranged to be selectively brought into operative relation by means of a gear 33 with a series of gears 25, of different diameters, secured to a shaft 26, having operative connection, as by a coupling 27, with the shaft 18, so as to impart the rotations and the speeds thereof of the shaft 22 to the shaft 18. The gear-box may be on a base 28.

A tumbler arm 31 has bearings 32 about the hub of the gear 23. A gear 33 is journaled in the tumbler-arm and meshes with the gear 23, and is arranged to be selectively meshed with any one of the series of gears 25, and to be held in engaged relation by a latch 34, operated by a handle 35, in suitable or ordinary manner. The gear 23 is in mesh with the gear 33, but does not mesh with any of the gears of the nest of gears 25. The transmission is effected from the drive-shaft 22 to the gear 23, having spline-key connection therewith, to the gear 33, and thence selectively through any one of the nest of gears 25 fast on the shaft 26.

In the present exemplification the gear-box is provided with bearings 38, 39, in which the shaft 22 is journaled. The bearing 38 is exemplified as a ball-bearing. The gear-box is provided with a stud-journal 41 received about the bearing 38.

A casing 43 comprises a body portion 44 and a closing plate 45, suitably secured to the body portion by means of bolts 46. The casing encompasses a tight pulley 51, fixed to the shaft 22, and a loose pulley 52, rotatable loosely about the shaft 22. The pulley 51 is the driven pulley with relation to the source of power and is arranged to drive the drive-shaft 22.

In the present exemplification the ball-bearing 38 is located within the stud-journal, the outer race-way 53 of the ball-bearing being received against a shoulder 54 of the gear-box and the inner race-way 55 received against a shoulder 56 on the shaft 22. A cap 57 is arranged to close the recess 58 in which the ball-bearing is located, being secured in place by means of bolts 59.

The casing is arranged pivotwise about the axis of rotation of the tight pulley and the loose pulley, exemplified as accomplished by providing the casing with a clamp-bearing 61, which is received about the stud-journal 41, and adjustable about said axis to position the casing rotatively about the pulleys or in selective radial relation thereto.

This is shown accomplished by means of the clamp-bearing 61, which is received about and snugly fits the stud-journal 41, the said clamp-bearing and the end wall 62 of the casing being provided with a slit 63, the walls of which are arranged to be drawn toward one another for firmly clamping the bearing about the stud-journal, shown accomplished by means of a screw 64 received through lugs 65, 66, at the respective sides of the slit, and having a nut 67 received over the threaded end of the bolt for clamping the clamp-bearing about the stud-journal and fixing the casing in position, with the belt-openings therein projected in suitable direction to accommodate the belt projected from the driving pulley, regardless of the radial direction in which the latter may be located with relation to the casing.

While I have shown the casing rotatively mounted on the gear-box, it is obvious that the same may be rotatively mounted on any other part or device in connection with which it is to operate. It may for instance be mounted on the stud-journal 69 at the base of the drilling machine, with the clamp-bearing received about and clamped in selective radial relation about said stud-journal.

The casing is provided with belt-slots 71, 72, through which opposite stretches 73, 74, of a belt 75, received about the pulleys, are arranged to project. The stretches of the belt may extend in suitable directions transverse to the axes of rotation of the pulleys for receiving power from a shaft and pulley arranged parallel or otherwise with the axis of rotation of the tight and loose pulleys, and located at a desired and selective position radially with relation to said axes of rotation. The arrangement stated enables the belt to be received from a source of power located selectively in different positions radially with relation to the axis of rotation of the pulleys.

Several of these positions are indicated in the drawings. For example, Fig. 1 illustrates an arrangement with the stretches of the belt extending in one direction so as to reach a pulley source of power, while Fig. 4 shows a different direction for the belt in full lines, and a still different position therefor in dotted lines. Other pivotal positions of the casing may be employed.

A belt-shifter 78 is mounted on the casing, this mounting being a shiftable mounting, shown on a pivot-bolt 79. The belt-shifter comprises an arm 81, at the outer end of which there is a belt-receiving loop 82. This loop is shown comprising belt-contacting walls at the respective ends thereof which are at obtuse angles with relation to each other, so arranged that when the belt-shifter is shifted to locate the belt upon the loose pulley 52, the walls 83, 84, of said loop coact with the belt, whereas, when the belt-shifter is shifted to place the belt about the tight pulley 51 of the mechanism, the walls 85, 86, of said belt-loop are arranged to be engaged by the belt, with said walls at right angles to the plane of the belt.

The belt-shifter further comprises an arm 88, shown as projected radially outward and laterally with relation to the arm 81, and provided at its outer end with a handle 89, arranged in spaced relation to the belt-loop, that is to say, the handle of the belt-shifter is spaced from said loop. The operating arm is so located with relation to the casing and the belt and belt-loop that its handle is free or spaced from the belt and the various other parts of the mechanism, so that the same may be readily shifted throughout the various radial positions of the casing.

The belt-shifter and its loop and handle move with the casing in the adjustments of the latter, and the construction and arrangements of parts provides for the adjustments of the casing by mere unclamping relation of the clamp-bearing 61 and the pivotal swinging or rotation or partial rotation in either direction of the casing upon the clamp-bearing supported by the stud-journal, the clamp-bearing being clamped fixedly to and about the stud-journal when the parts have been placed in adjusted relation.

The casing is also preferably provided with means for limiting the shifting movements of the belt-shifter and for guiding the latter. Thus the casing is provided with a guideway 91 on a lug 92, pins 93, 94, being at the respective end of said guideway, a lug 90 on the arm 81 coacting with the guideway. The arm 81 is arranged to contact said respective pins at the respective limits of movements of the belt-shifter loop for arranging the belt respectively about the loose pulley or the tight pulley.

The pivot for the belt-shifter and the limit pins are preferably located between the belt-slots.

The end plate 45 is provided with an opening 96 coincident with the position of the drive-shaft and the loose pulley thereon for ready access to the latter for lubricating the same.

The belt slots 71, 72, in the body portion of the casing are open-ended at their outer ends for readily receiving the stretches of the belt therethrough. These belt-slots are arranged to be closed by the end plate 45, which is exemplified as having the outer end walls 97, 98, for the belt-slots thereon.

My invention provides a compact mechanism arranged to be mounted at the end of a variable speed gear-box for imparting motion at various speeds through the gear-box to the mechanism to be driven. The invention is also employable in other relations.

Having thus fully described my invention, what I claim as new, and desire to secure by Letters Patent, is:

1. In a device of the character described, the combination of a casing for a tight pulley and a loose pulley, said casing forming a support for a belt-shifter, said casing comprising a bearing on which said casing is pivoted about the axes of rotation of said pulleys, a belt-shifter, means for shiftably mounting said belt-shifter on said casing, said last-named means and said belt-shifter movable with said casing about said axes, and means to fix said bearing in adjusted positions.

2. In a device of the character described, the combination of a casing for a tight pulley and a loose pulley, said casing forming a support for a belt-shifter and comprising a clamp-bearing whose axis is coincident with the axes of said pulleys, said casing provided with openings for the opposite stretches of a belt passing about said pulleys, a belt-shifter for said belt, and means for pivoting said belt-shifter to said casing, said clamp-bearing formed as a pivot for said casing for adjusting said casing about said coincident axes and arranged to clamp said casing in adjusted positions.

3. In a device of the character described, the combination of a casing for a tight pulley and a loose pulley, said casing provided with a belt-opening, said casing forming a support for a belt-shifter for shifting a belt passing through said opening, a shaft on which said pulleys are mounted, a bearing for said shaft, means for pivoting said casing about said last-named bearing whereby to adjust the position of said belt-opening about said shaft, said belt-shifter movable with said casing, and means for fixing said casing in adjusted positions.

4. In a device of the character described, the combination of a casing, a shaft extending into said casing, a bearing for said shaft, a stud-journal about said shaft, a tight pulley and a loose pulley about said shaft in said casing, said casing provided with a belt-opening for a belt passing about said pulleys, a belt-shifter for said belt, said belt-shifter shiftably mounted on and movable with said casing, a clamp-bearing for said casing about said stud-journal arranged for adjustment of said casing about said stud-journal to position said belt-opening and said belt-shifter about the axis of said shift, and means for clamping said clamp-bearing about said stud-journal in adjusted positions.

5. In a device of the character described, the combination with a speed-changing gear-box and a drive-shaft journaled therein, of a stud-journal on said gear-box about said drive-shaft, a tight pulley and a loose pulley about said drive-shaft outside said gear-box, a casing about said pulleys, said casing comprising a bearing about said stud-journal whereby to pivot said casing to said gear-box, said casing provided with a belt-opening, a belt-shifter shiftably mounted on said casing, said belt-shifter comprising a belt moving part at said opening and a handle spaced from said opening, constructed and arranged whereby to adjust said casing with said belt-opening and said belt-shifter about the axis of said stud-journal, and means for securing said casing in adjusted positions.

6. In a device of the character described, the combination of a casing for a tight pulley and a loose pulley, said casing provided with a body portion in which said pulleys are arranged to be received and an end closing plate, said body-portion comprising a clamp-bearing about the axes of rotation of said pulleys, said body portion having open-ended belt-slots for the opposite stretches of a belt received about said pulleys, a belt-shifter pivoted on said body-portion between said belt-slots, and means for securing said end closing plate to said body-portion whereby to enclose said pulleys and to close the ends of said belt-slots, said body-portion with said belt-shifter thereon and movable therewith adjustable on said clamp-bearing to project said belt-slots in different positions about the axes of rotation of said pulleys, and said clamp-bearing comprising clamping means for clamping said casing in adjusted positions.

7. In a device of the character described, the combination of a casing for a tight pulley and a loose pulley, said casing comprising a body portion in which said pulleys are arranged to be received and a closing plate, said body portion comprising a clamp-bearing about the axes of rotation of said pulleys, said body portion having open-ended belt-slots for the opposite stretches of a belt received about said pulleys, a belt-shifter, a pivot therefor, and limiting means for limiting the shifting movements of said belt-shifter, said pivot and limiting means located on said body portion between said belt-slots, and means for securing said end closing plate to said body portion whereby to enclose said pulleys and to close the ends of said belt-slots, said body portion with said belt-shifter thereon and movable therewith adjustable on said clamp-bearing to project said belt-slots in different positions about the axes of rotation of said pulleys, and said clamp-bearing comprising clamping means for clamping said casing in adjusted positions.

In testimony whereof, I have hereunto signed my name in the presence of two subscribing witnesses.

JAMES E. LARSH.

In presence of—
 DELMA WERNSING,
 C. J. KROUSE.